Figure 1:
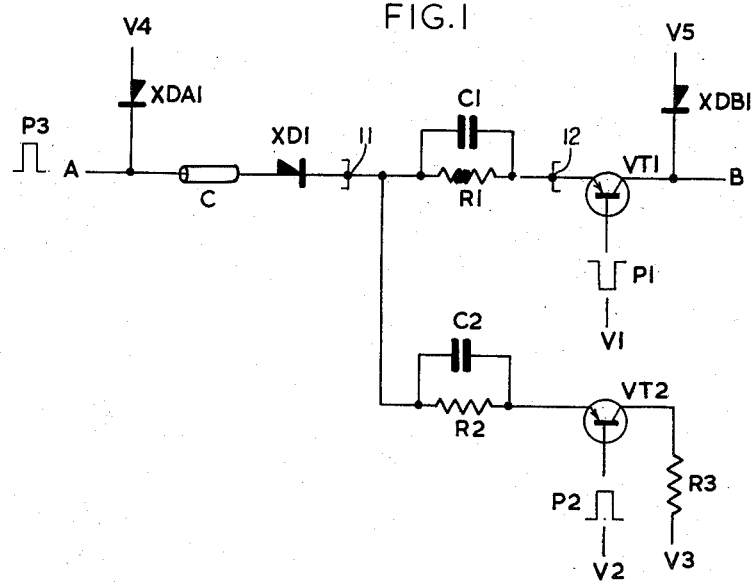

May 4, 1965   J. F. HESKETH   3,182,202
ELECTRIC PULSE OPERATED SWITCHING CIRCUIT
Filed Dec. 13, 1960

INVENTOR
JOHN FREDERICK HESKETH
BY Hall & Houghton
ATTORNEYS

United States Patent Office 3,182,202
Patented May 4, 1965

3,182,202
ELECTRIC PULSE-OPERATED SWITCHING CIRCUIT
John Frederick Hesketh, Greenford, England, assignor to Her Majesty's Postmaster General, London, England
Filed Dec. 13, 1960, Ser. No. 75,615
Claims priority, application Great Britain, Dec. 18, 1959, 43,173/59
1 Claim. (Cl. 307—88.5)

This invention relates to electric pulse transmission systems, for example, electric pulse transmission systems used in telecommunications and in computers.

Logical processes of the type employed in pulse transmission systems can be carried out by means of electronic switches or gates. The signals applied to the gates may take the form of electric pulses having a duration of the order of a fraction of 1 microsecond. When using such pulses it is necessary to allow a time interval between successive pulses in order that the components of the gate and associated circuitry may reach a quiescent condition after the application of a pulse before applying the next pulse. During that interval any electrostatic and electromagnetic charge on the wiring connecting gates can leak away and in cases where the stray capacitance of the wiring is large or where co-axial cables are used as transmission paths, the time taken to complete the discharge may determine the shortest time interval which can be used.

Many transmission circuits employ transistors as gates which are connected by lengths of co-axial cable having an appreciable stray capacitance and stored energy at the end of each pulse. Furthermore the transistors exhibit carrier storage phenomenon which give rise to an additional "memory" in the gate. Such stored energy may be delivered to the load during the period allocated to subsequent pulses and thereby give rise to interference and crosstalk.

It can be shown that the energy stored in each unit length of a transmission path such as a co-axial cable is a minimum when $$\frac{\text{The instantaneous potential } v}{\text{The instantaneous current } i} = R_0$$

(the characteristic resistance of the cable) at all points along the cable. Furthermore, when the cable is terminated in a load equal to $R_0$, there is no energy reflected from the termination. If reflections are allowed to occur at each end of the cable, some of the energy of a pulse would be delivered to the load at instants of time delayed by $2n$ (propagation time of the cable) where $n$ is an integer. Such reflected pulses may well arrive at the load coincident with subsequent pulses thus giving rise to further interference and cross talk.

It is an object of the present invention to provide a pulse transmission system in which means are provided for permitting the discharge of the energy remaining after the passage of a pulse, for example, the electrostatic charge on stray capacitances.

According to the present invention an electric pulse transmission system comprises a pulse source, a pulse transmission path connected thereto, a discharge circuit joined to the output of the path and including a current flow control device, the discharge circuit being terminated by a resistive load substantially equal to the characteristic resistance of the path, first bias means for maintaining the control device in a conducting condition such that the load is connected to the path, and further bias means sufficient to overcome the first bias means and thereby to render the device non-conducting to allow a pulse or a part thereof from the source to appear at the outlet of the path.

Preferably, the first bias means is connected to the input of the transmission path. The current flow control device may be the emitter-collector circuit of a transistor whose conductivity is controlled by the further bias means which is joined to the base of the transistor. The further bias means may comprise a second pulse source whose pulses are of sufficient amplitude to overcome a D.C. bias applied to the transistor from the first source.

The transmission path will normally comprise a co-axial cable which constitutes a highway in a time division multiplex communication system. The duration of pulses transmitted over the highway can be reduced by employing a second pulse source able to supply pulses of a duration equal to that of pulses which it is required to transmit over the highway.

By way of example only, embodiments of the invention suitable for use in time division multiplex communication systems will now be described in greater detail with reference to the accompanying drawings which are circuit diagrams of the embodiments.

Referring first to FIGURE 1, the co-axial cable C constitutes the transmission highway of a time division multiplex communication system and is joined at its output end to a number of transistor gates, of which one, VT1, is shown, via a rectifier XD1 and a network consisting of a parallel connected resistor-capacitor combination C1R1. VT1 is a p-n-p alloy type transistor. The emitter of transistor VT1 is joined to the cable C whilst the collector is connected to an output point B. The base of transistor VT1 is connected to a source P1 of pulses and a source of D.C. bias potential V1.

Also joined to the emitter of VT1 is a discharge path comprising a second resistor-capacitor network C2R2 in series connection with the emitter-collector-circuit of a second transistor VT2. A resistive load R3 substantially equal to the characteristic resistance of the highway is connected to the collector of VT2. VT2 is also a p-n-p alloy type transistor and its base is joined to a second source of pulses P2 and a source of D.C. bias V2. Resistor R3 is connected to a source of potential V3.

Connected to the input end A of the cable C is a rectifier XDA1 joined to a D.C. potential source V4 whilst another rectifier XDB1 is joined between the output B of the co-axial cable and a source of D.C. potential V5.

Co-axial cable C may be only one of several cables joined to the number of transistor gates and this is indicated in FIGURE 1 by the common points 11 and 12. In such a circuit, each cable has its own series connected rectifier XD1 and this prevents feedback between the several cables.

Potential V1 is more positive than potential V4 by an amount sufficient to cut off VT1 whereas potential V2 is negative with respect to V4 so that VT2 is conducting and a small current flows from V4 via XDA1, cable C, XD1, C2R2, VT2 conducting and R3 to V3 which is more negative than V2.

Pulses P2 applied to the base of transistor VT2 cause the latter to cut off. The amplitude of pulses from source P1 is selected in such manner that VT1 does not conduct unless a pulse P3 is received, simultaneously with P1, from the cable C. The pulse P3 may be modulated and when the pulses P1, P2 and P3 occur coincidentally, an undistorted output appears at point B.

If the durations of pulses from sources P2 and P3 are equal then the resultant pulse at B is of the same duration. If, however, the duration of pulses from P2 is less than that of pulses from P3, the duration of the output pulses at B will equal that from the pulses P2. In addition to a reduction in duration, a reshaping of pulses transmitted along the cable C is also effected.

The networks R1C1 and R2C2 are chosen to increase the input impedances of the transistors VT1 and VT2 to match the characteristic resistance of the cable. R1 and R2 are determined under steady current conditions whilst C1 and C2 compensate for the "switch-on phenomenon" in which the input impedances appear higher at lower values of current at the leading edge of applied pulses such as those from P3.

With the circuit of FIG. 1, it is necessary for the potential of V5 to be more negative than that of V4 so that if similar gates are connected to the point B, the values of V1, V2 and V3 must be changed accordingly to produce a D.C. potential gradient throughout the system.

Figure 2:
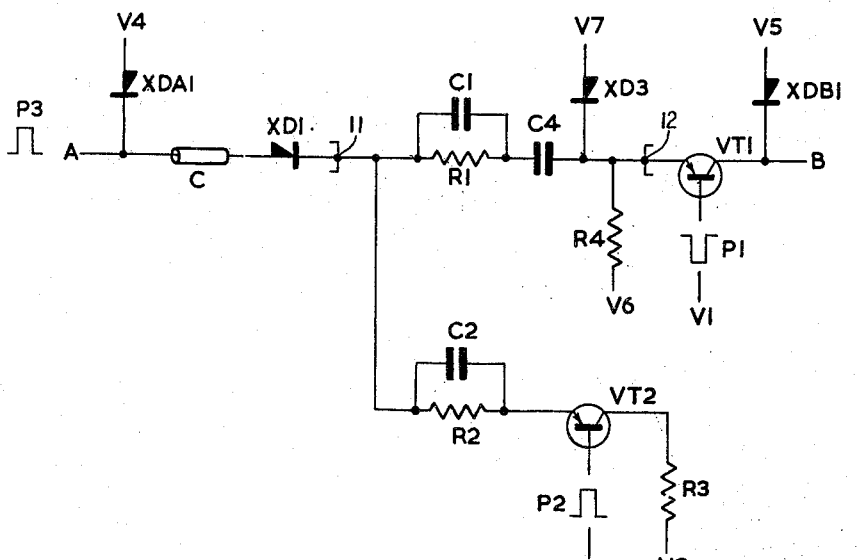

It is however possible to reduce the number of different values of D.C. potential and one method is illustrated in FIG. 2 in which a blocking capacitor C4 is inserted between the network R1C1 and the emitter of VT1. It is then necessary to provide a separate bias for the emitter of VT1 and this is applied via a crystal diode XD3 and resistor R4 connected between potential sources V6 and V7.

It will of course be understood that transistors of other types than p-n-p alloy may be used but where n-p-n structures are used the potentials of the various D.C. biasses must be reversed. Further, it may be possible to simplify the circuits used to increase the input impedance of the transistors by the use of a cable having a higher impedance than normal.

I claim:

An electric pulse-operated switching circuit comprising in combination a pulse source, a pulse transmission path connected to said source, a first source of bias potential joined to said transmission path which is terminated in its characteristic impedance by means comprising a plurality of pulse-controlled output gates each joined to said transmission path, each said output gate having an output circuit connected to it, and a second source of bias potential connected to each said output circuit, a third source of bias potential for each output gate sufficient in combination with said first source of bias potential to render said output gate non-conducting, a first source of bias pulses for each output gate such that when a pulse from said first bias pulse source coincides with a pulse from said pulse source, said output gate is switched to a conducting condition, a discharge path connected to said transmission path in parallel with said output gates, said discharge path containing an impedance of value equal to the characteristic impedance of said transmission path, a further pulse-controlled gate in said discharge path for controlling the flow of current therethrough, a fourth source of bias potential connected to said further pulse-controlled gate and such that taken with said first source of bias potential, said further pulse-controlled gate is rendered conducting, and a second source of bias pulses connected to said further pulse-controlled gate for switching the latter to a non-conducting condition.

References Cited by the Examiner

UNITED STATES PATENTS

| 2,992,338 | 7/61 | Winters | 307—88.5 |
| 2,997,606 | 8/61 | Hamburger et al. | 307—88.5 |
| 3,071,651 | 1/63 | Frankel | 307—88.5 |

FOREIGN PATENTS 801,062   9/58   Great Britain.

OTHER REFERENCES

Langford-Smith: Radiotron Designer's Handbook, 1953, Radio Corp. of America (page 891 relied on).

ARTHUR GAUSS, *Primary Examiner.*

HERMAN KARL SAALBACH, GEORGE N. WESTBY, *Examiners.*